United States Patent
Iguchi et al.

(10) Patent No.: US 7,799,409 B2
(45) Date of Patent: Sep. 21, 2010

(54) CERAMIC GREEN SHEET STRUCTURE AND METHOD FOR MANUFACTURING LAMINATED CERAMIC ELECTRONIC COMPONENT

(75) Inventors: Toshihiro Iguchi, Tokyo (JP); Akitoshi Yoshii, Tokyo (JP); Akira Goshima, Tokyo (JP); Kazuyuki Hasebe, Tokyo (JP); Takaki Shinkawa, Tokyo (JP); Hiroki Saitoh, Tokyo (JP); Makoto Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/164,553

(22) Filed: Jun. 30, 2008

(65) Prior Publication Data

US 2009/0042048 A1   Feb. 12, 2009

(30) Foreign Application Priority Data

Aug. 8, 2007   (JP)   ............... 2007-206183

(51) Int. Cl.
*B32B 9/00* (2006.01)
*H01G 4/00* (2006.01)
(52) U.S. Cl. .............. 428/210; 428/209; 428/307.3; 361/303; 361/311; 361/314; 361/320
(58) Field of Classification Search ........... 428/210, 428/209, 307.3; 361/303, 311, 323, 314, 361/320
See application file for complete search history.

(56) References Cited

U.S. PATENT DOCUMENTS

| 3,965,552 A * | 6/1976 | Rutt ..................... 29/25.42 |
| 4,030,004 A * | 6/1977 | Rutt ..................... 361/313 |
| 6,295,196 B1 * | 9/2001 | Hamaji et al. ............ 361/321.2 |
| 6,589,446 B1 * | 7/2003 | Nakamura et al. ....... 252/363.5 |
| 2007/0218592 A1 | 9/2007 | Kobayashi et al. |

FOREIGN PATENT DOCUMENTS

| JP | 9-129486 | 5/1997 |
| JP | 11-111560 | 4/1999 |
| JP | 11-260665 | 9/1999 |
| JP | 11-340082 | 12/1999 |
| JP | 2000-173858 | 6/2000 |
| JP | 2002-361624 | 12/2002 |
| JP | 2004-299973 | 10/2004 |
| JP | 2005-213053 | 8/2005 |
| WO | WO 2005/113208 A1 | 12/2005 |

* cited by examiner

*Primary Examiner*—Cathy Lam
(74) *Attorney, Agent, or Firm*—Oblon, Spivak, McClelland, Maier & Neustadt, L.L.P.

(57) ABSTRACT

A ceramic green sheet structure has a ceramic green sheet including at least a ceramic material and a resin and a conductive layer formed on the ceramic green sheet. An electrode non-formed area has a porosity equal to or greater than 17%, and preferably, equal to or less than 25%. Moreover, an electrode formed area where the conductive layer is formed may have a smaller porosity than the electrode non-formed area where no conductive layer is formed.

2 Claims, 5 Drawing Sheets

CERAMIC GREEN SHEET STRUCTURE AND METHOD FOR MANUFACTURING LAMINATED CERAMIC ELECTRONIC COMPONENT

BACKGROUND OF THE INVENTION

1. Field of the Invention

The present invention relates to a ceramic green sheet structure and a method for manufacturing a laminated ceramic electronic component.

2. Description of the Related Art

Laminated ceramic capacitors being one example of laminated ceramic electronic components have been manufactured according to the following process. At first, a dielectric paste is coated in the form of a sheet on a PET film and then dried to obtain a ceramic green sheet. Then, a conductive past is printed or coated in a given pattern on the ceramic green sheet, followed by drying. After drying, the PET film is removed to obtain a ceramic green sheet with internal electrodes disposed on an upper surface thereof. Then, the ceramic green sheet is cut into sheets of a certain size, and a certain number of these sheets are stacked such that upper and lower internal electrodes are staggered with respect to each other. The resulting green sheet laminate is pressed and then cut into a plurality of rectangular parallelepiped green chips. Then, the individual green chips are polished for rounding the corners, fired, and provided with terminal electrodes, thereby obtaining a laminated ceramic capacitor (see Japanese Unexamined Patent Application Publication No. 9-129486).

However, when the laminated ceramic electronic component is manufactured with a number of ceramic green sheets stacked as described above, there has been a possibility that air bubbles trapped between the sheets may cause cracking during firing or a transfer process, undermining the credibility.

SUMMARY OF THE INVENTION

The present invention has been devised in view of the above and has an object to provide a ceramic green sheet structure that can eliminate the problem of trapping air bubbles between sheets and a method for manufacturing a laminated ceramic electronic component.

In order to solve the above-mentioned problem, the present invention provides a ceramic green sheet structure comprising:

a ceramic green sheet including at least a ceramic material and a resin; and a conductive layer formed on the ceramic green sheet, wherein an electrode non-formed area where no conductive layer is formed has a porosity equal to or greater than 17%.

Preferably, the electrode non-formed area has a porosity equal to or less than 25%.

Moreover, an electrode formed area where the conductive layer is formed may have a smaller porosity than the electrode non-formed area.

In order to solve the same problem, the present invention also provides a method for manufacturing a laminated ceramic electronic component comprising:

fabricating ceramic green sheets including at least a ceramic material and a resin and having a porosity equal to or greater than 17%;

forming a conductive layer on each ceramic green sheet;

stacking the ceramic green sheets each having the conductive layer to form a green sheet laminate;

cutting the green sheet laminate into a given size to obtain a plurality of green chips; and firing the green chip.

According to the present invention, there can be eliminated the problem of trapping air bubbles between sheets.

Other features of the present invention and effects therefrom will be described in detail with reference to the embodiments and the accompanying drawings.

DESCRIPTION OF THE PREFERRED EMBODIMENTS

Figure 1:
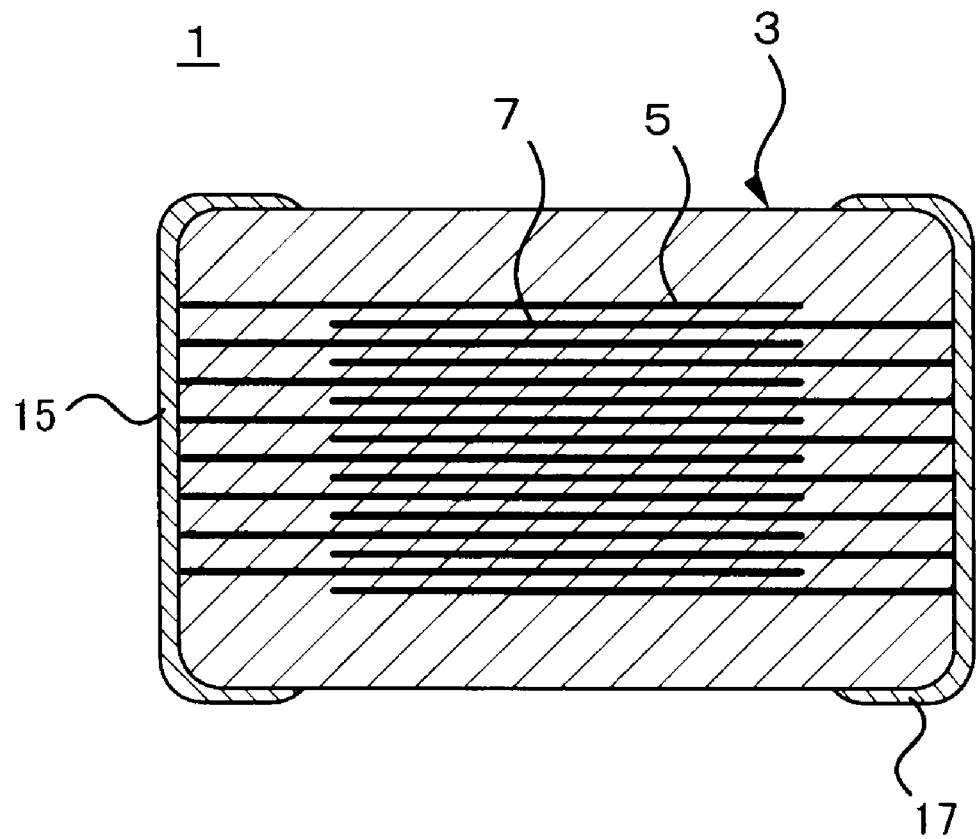
FIG. 1 is a sectional view showing a structure of a laminated ceramic capacitor.

Hereinbelow, one embodiment of the ceramic green sheet structure according to the present invention and one embodiment of the method for manufacturing a laminated ceramic electronic component adopting it will be described as an example of a laminated ceramic capacitor. It should be noted that in the drawings, the same or corresponding portions are designated by a common symbol.

FIG. 1 is a sectional view showing an example of a laminated ceramic capacitor. The illustrated laminated ceramic capacitor 1 has a plurality of internal electrodes (conductive layers) 5, 7 embedded in a ceramic body 3 composed of a ceramic. As will be described below, the ceramic body 3 is formed by stacking a plurality of ceramic green sheets.

The internal electrodes 5, 7 adjacent to each other in the vertical direction of the figure are staggered with respect to each other and opposed to each other through a ceramic layer constituting the ceramic body 3. The number of layers of the internal electrodes 5, 7 depends on the required capacitance.

The opposite side faces of the ceramic body 3 are provided with terminal electrodes 15, 17 which serve as external electrodes. The internal electrodes 5 are electrically connected to the terminal electrode 15, while the internal electrodes 7 are electrically connected to the terminal electrode 17.

Figure 2:
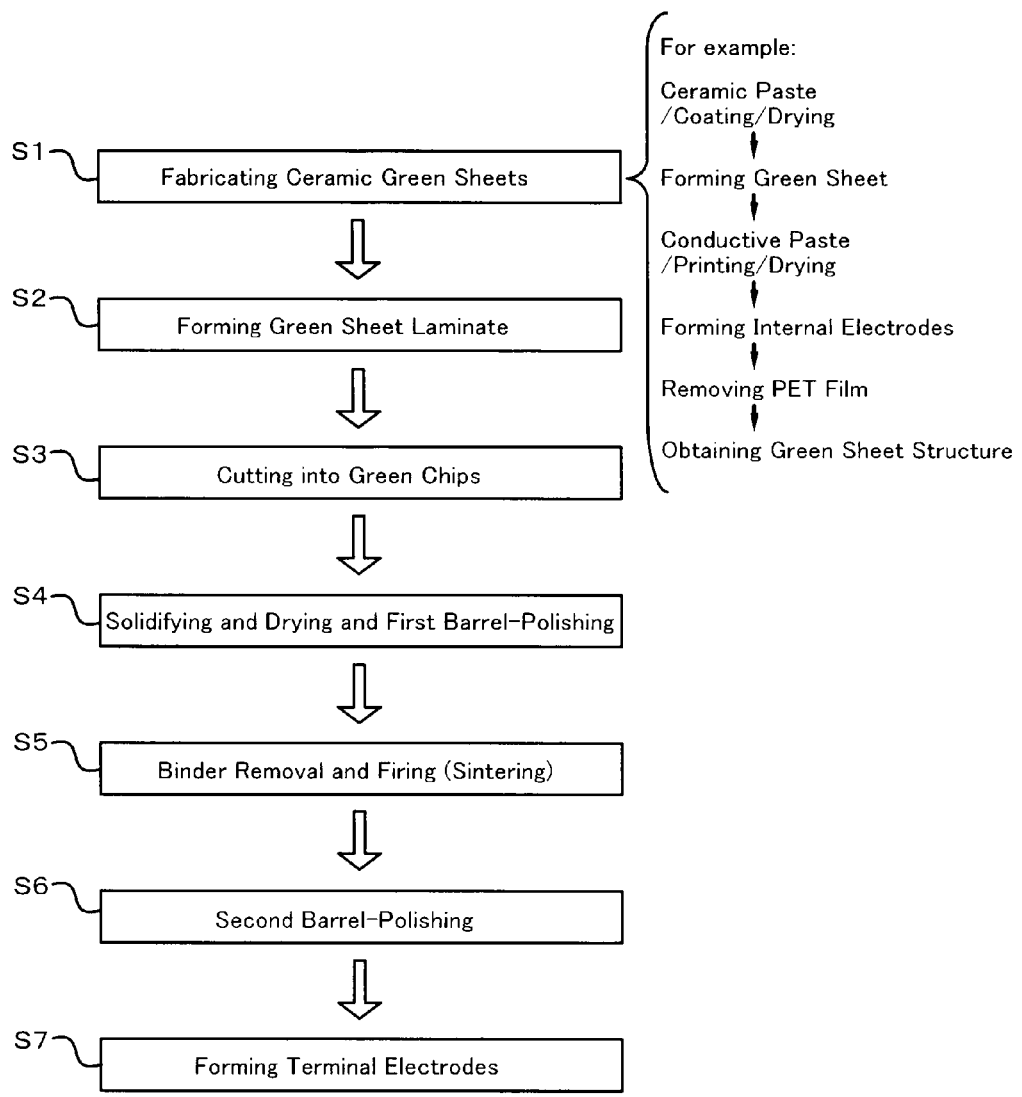
FIG. 2 is a process chart of a method for manufacturing a laminated ceramic capacitor according to one embodiment of the present invention.

Next will be described a method for manufacturing a laminated ceramic capacitor according to one embodiment of the present invention. First of all, as a step S1 shown in FIG. 2, a plurality of ceramic green sheets including at least a ceramic material and a resin and having a porosity equal to or greater than 17% are fabricated, and each of the sheets is provided with internal electrodes.

Figure 3:
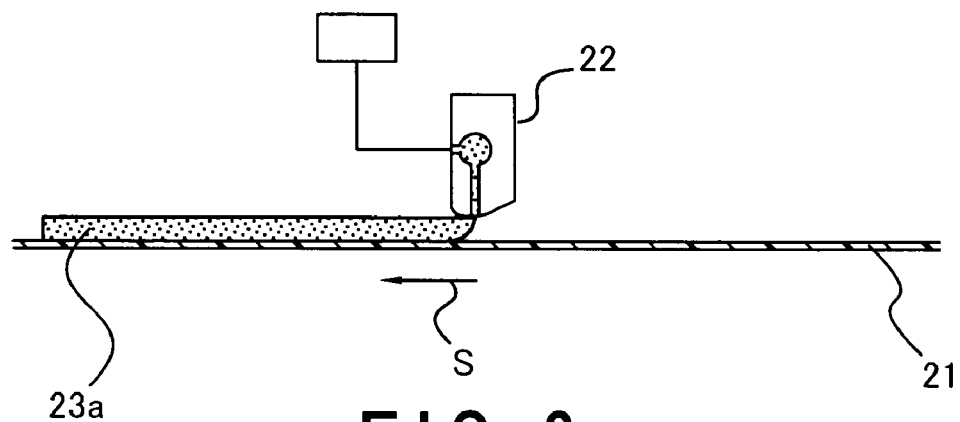
FIG. 3 is a diagram showing a step of forming a ceramic green sheet.

To describe this step in more detail, for example, a ceramic paste 23a is coated in the form of a sheet on an upper surface of a flexible PET film 21, as shown in FIG. 3. The ceramic paste may be coated by using a coating means 22 such as a doctor blade or an extrusion head. In the illustrated embodiment, the ceramic paste 23a is applied in the form of a sheet by moving the PET film 21 in the direction of an arrow S with respect to the coating means 22. Subsequently, the ceramic paste 23a is dried to obtain a ceramic green sheet 23 supported on the upper surface of the PET film 21 (see FIG. 4).

The ceramic paste 23a may include a ceramic material powder such as barium titanate, a binder containing a resin material powder, a solvent, and optionally a plasticizer.

The ceramic green sheet 23 should have a porosity equal to or greater than 17%. The porosity can be measured as follows. The bottom surface of the ceramic green sheet, i.e., the surface now covered with the PET film is observed with an electron microscope to measure the total length of the area occupied by particles on a reference line. The porosity [%]= (B−X)/B, wherein X represents the total length [µm], and B represents the length of the reference line [µm] (e.g., 10 [µm]).

The porosity can be controlled by preparation of the solvent and the resin material among the elements constituting the ceramic paste. For example, when using a butyral-based resin, the porosity can be controlled by adjusting the compounding condition of a good solvent for butyral such as "alcohol" and "methyl ethyl ketone" with a poor solvent for butyral such as "toluene", "xylene", and "a petroleum solvent such as naphtha". As used herein, the good solvent means a solvent with a high degree of solubility for a resin, while the poor solvent means a solvent with a low degree of solubility for a resin. Alternatively, when using an acrylic resin, the porosity can be controlled by adjusting the compounding condition of a good solvent for an acrylic resin such as "acetone", "methyl ethyl ketone", and "acetic ether" with a poor solvent for an acrylic resin such as "a petroleum solvent such as naphtha".

Figure 4:
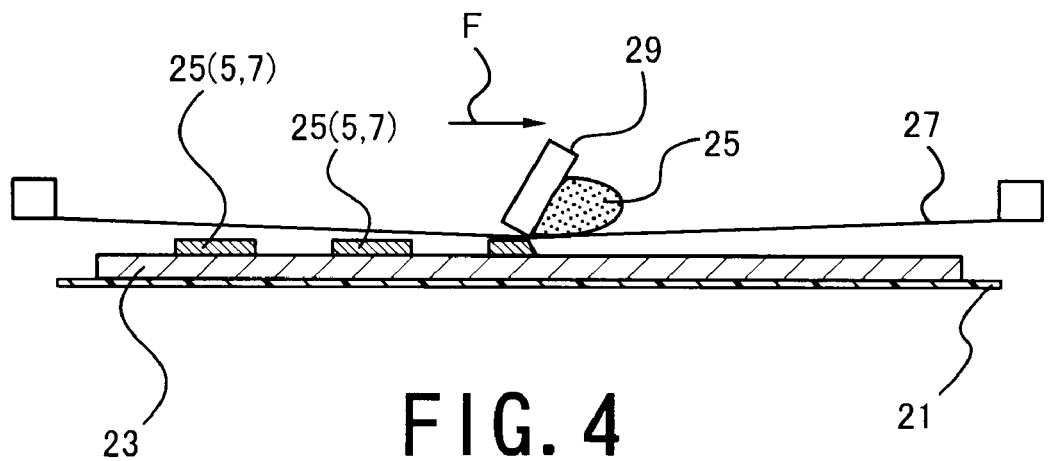
FIG. 4 is a diagram showing a step of forming a conductive layer.

Subsequently, as shown in FIG. 4, a conductive paste 25 is coated at desired positions on the upper surface of the ceramic green sheet 23 whose porosity after drying is equal to or greater than 17%. The application of the conductive paste 25 may be performed, for example, by screen printing or gravure printing. FIG. 4 illustrates screen printing. In detail, printing is performed such that a squeegee 29 is moved in the direction of an arrow F across the surface of a screen 27, thereby extruding the conductive paste 25 onto the surface of the ceramic green sheet 23. Subsequently, the printed conductive paste is dried to obtain internal electrodes 5, 7. The conductive paste 25 may include a conductive metal material powder such as nickel and copper, a binder containing resin material powder, a solvent, and optionally a ceramic material powder such as barium titanate and a plasticizer as a common material.

Subsequently, the PET film 21 is removed from the ceramic green sheet 23 to obtain a ceramic green sheet structure 10 with the internal electrodes (conductive layers) 5, 7 on the ceramic green sheet 23 (see FIG. 5).

Figure 5:
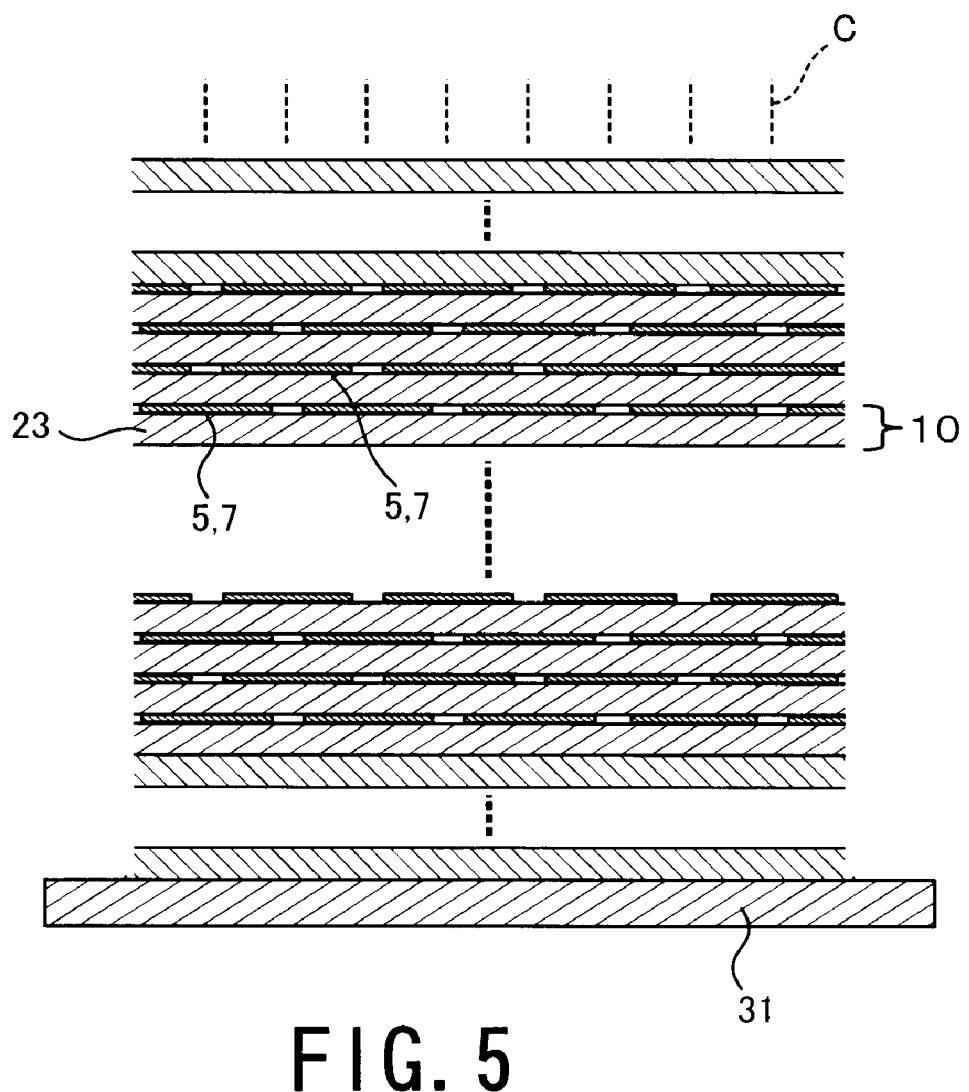
FIG. 5 is a diagram showing a stacked state of ceramic green sheets and how to cut them.

Then, as a step S2, a plurality of the ceramic green sheet structures 10 obtained at the step S1 are stacked on a receiving table 31, as shown in FIG. 5. It should be noted that the ceramic green sheets stacked at upper and lower areas in the lamination direction are not provided with the internal electrodes 5, 7. The area where the internal electrodes 5, 7 are disposed is a so-called inner layer portion of the laminated ceramic capacitor 1, while the upper and lower areas where no internal electrodes 5, 7 are disposed and which are composed only of the ceramic layers serve as a so-called outer layer portion of the laminated ceramic capacitor 1. The required number of layers of the ceramic green sheets 23 depends on the required capacitance and the like.

The ceramic green sheets may be stacked in a variety of ways. For example, the inner layer portion may be formed by stacking the required number of the ceramic green sheets 23 with the internal electrodes 5, 7, while the outer layer portions may be formed in a separate process and then combined with the inner layer portion. Alternatively, it is also possible to sequentially stack laminates that are formed by combining and drying a few ceramic green sheets not in units of the inner or outer layer portion.

When the ceramic green sheet structures 10 are stacked to form the inner layer portion, adjacent two ceramic green sheet structures 10 are stacked such that the internal electrodes 5, 7 on one ceramic green sheet structure 10 overlie part of the internal electrodes 5, 7 on the other ceramic green sheet structure 10 and the gaps between these internal electrodes 5, 7.

Thereafter, as a step S3, the green sheet laminate is pressed and then cut at positions indicated by C in FIG. 5 into a plurality of rectangular parallelepiped green chips. Furthermore, the green chip is solidified and dried (if necessary) and subjected to a first barrel-polishing, as a step S4, subjected to a binder removal for burnout of a binder component and then fired, as a step S5, subjected to a second barrel-polishing, as a step S6, and formed with terminal electrodes 15, 17, as a step S7, thereby providing the laminated ceramic capacitor shown in FIG. 1.

When a laminated ceramic electronic component is manufactured with a number of ceramic green sheets stacked, heretofore, there has been a possibility that air bubbles trapped between the sheets may cause cracking during firing or a transfer process, undermining the credibility. According to the present embodiment, however, since the ceramic green sheet has the following feature, the above problem can be eliminated.

Figure 6:
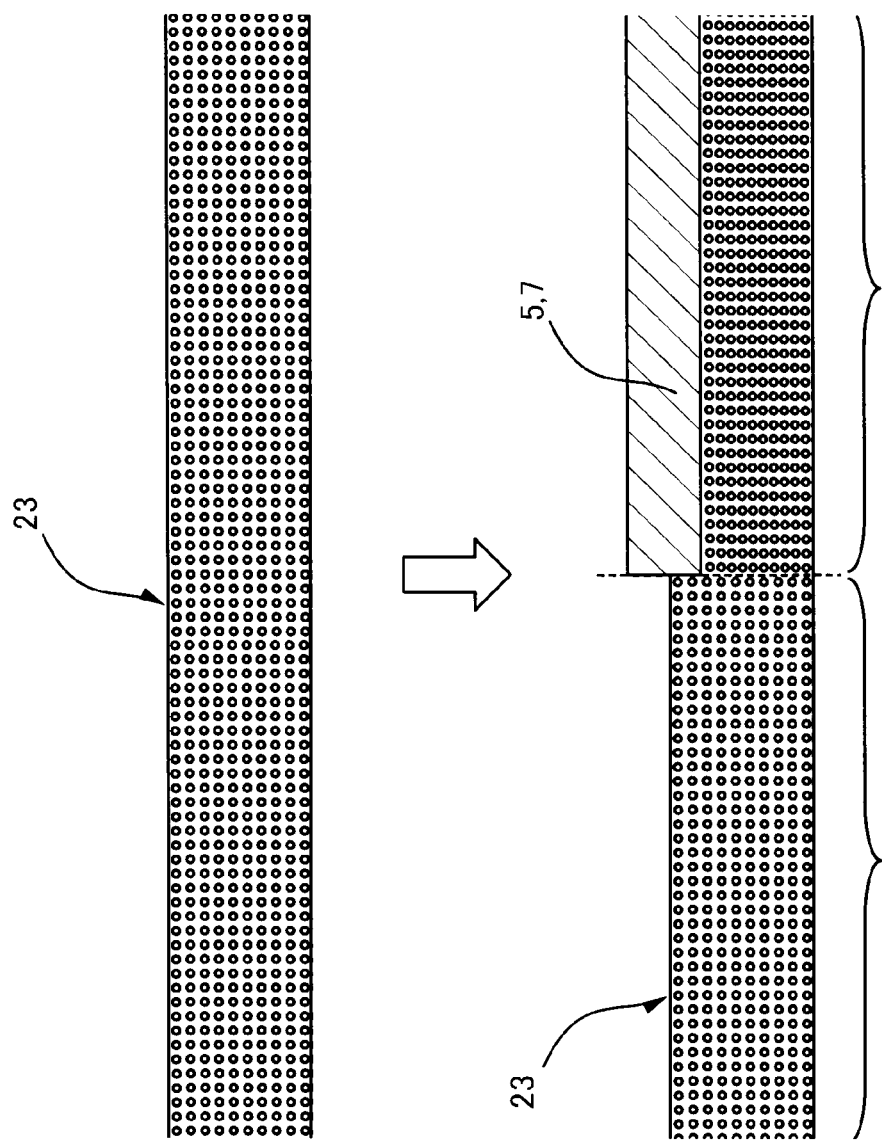
FIG. 6 is a diagram showing images of porosity before and after formation of a conductive layer.

Referring to FIG. 6, the ceramic green sheet 23 before formation of the internal electrodes 5, 7 has a porosity equal to or greater than 17%. When the internal electrodes 5, 7 are formed on the ceramic green sheet 23, the porosity decreases to about 15% at an electrode formed area 51 where the internal electrode 5, 7 is formed but remains at 17% or more at an electrode non-formed area 53 where no internal electrode 5, 7 is formed. Accordingly, when the ceramic green sheets 23 are stacked for formation of the green sheet laminate, air bubbles can easily pass through the electrode non-formed area 53 with a high porosity, thereby eliminating the problem of trapping air bubbles between sheets.

In this regard, the present inventors have studied the relationship between the porosity of the electrode non-formed area and the defective condition. The experimental results are shown in the Table below.

|  | Porosity of electrode non-formed area | Porosity of electrode formed area | Trapping of air bubbles | Number of units that caused short circuit |
| --- | --- | --- | --- | --- |
| Sample 1 | 27% | 15.5% | No | 3/100 |
| Sample 2 | 25% | 15.5% | No | 0/100 |
| Sample 3 | 23% | 15.0% | No | 0/100 |
| Sample 4 | 21% | 15.0% | No | 0/100 |
| Sample 5 | 17% | 15.0% | No | 0/100 |
| Sample 6 | 16% | 14.5% | Yes | 0/100 |
| Sample 7 | 15% | 14.5% | Yes | 0/100 |

As seen from the results of the Table, no air bubble was trapped in Samples 1, 2, 3, 4 and 5 where the porosity of the electrode non-formed area was 27%, 25%, 23%, 21% and 17%, respectively. On the other hand, the air bubbles were trapped in Samples 6 and 7 where the porosity of the electrode non-formed area was 16% and 15%, respectively.

In the above experiment, not only the occurrence of trapping of air bubbles but also the occurrence of short circuit was investigated. From this, it is confirmed that the short circuit occurred not in Samples 2 to 7 where the porosity of the electrode non-formed area varied from 15% to 25% but in Sample 1 where the porosity of the electrode non-formed area was 27%. Accordingly, if a more strict standard is required, the porosity of the electrode non-formed area is preferably equal to or less than 25%.

Also as seen from the above experimental results, when the porosity of the electrode non-formed area was at least in the range of 17% to 25%, which is thought to be a more preferred range in the present invention, it is confirmed that the porosity of the electrode formed area was smaller than that of the electrode non-formed area, i.e., the electrode formed area could be increased in density while maintaining the high porosity of the electrode non-formed area. This provides sufficient strength to prevent delamination.

While the details of the present invention have been specifically described with reference to the preferred embodiments thereof, it will be understood by those skilled in the art that various changes in form may be made therein based on the basic technical idea and teaching of the present invention.

The laminated ceramic electronic component to which the present invention is applicable is not limited to a laminated ceramic capacitor. Accordingly, for example, the present invention is also applicable to an inductor, a LC filter, and the like.

What is claimed is:

1. A ceramic green sheet structure comprising:
   a ceramic green sheet including at least a ceramic material and a resin; and
   a conductive layer formed on said ceramic green sheet,
   wherein an electrode non-formed area where no conductive layer is formed has a porosity equal to or greater than 17% and less than or equal to 25%.

2. The ceramic green sheet structure of claim 1, wherein an electrode formed area where said conductive layer is formed has a smaller porosity than said electrode non-formed area.

* * * * *